United States Patent
Oikawa (10) Patent No.: US 12,277,297 B2
(45) Date of Patent: Apr. 15, 2025

(54) TOUCH SENSOR HAVING A TOUCH DETECTION ELECTRODE COMPOSED OF FINE METAL WIRES

(71) Applicant: FUJIFILM Corporation, Tokyo (JP)

(72) Inventor: Tokuju Oikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/598,492

(22) Filed: Mar. 7, 2024

(65) Prior Publication Data
US 2024/0319830 A1    Sep. 26, 2024

(30) Foreign Application Priority Data
Mar. 20, 2023    (JP) ................................. 2023-043909

(51) Int. Cl.
*G06F 3/044*    (2006.01)
*G06F 3/047*    (2006.01)

(52) U.S. Cl.
CPC ............ *G06F 3/0443* (2019.05); *G06F 3/047* (2013.01)

(58) Field of Classification Search
CPC .............. G06F 3/0443; G06F 3/047; G06F 2203/04103; G06F 3/04164; G06F 3/0445; G06F 3/0446; G06F 2203/04112
See application file for complete search history.

(56) References Cited

U.S. PATENT DOCUMENTS

| 9,204,536 B2 | 12/2015 | Yoshiki |
| 2011/0260741 A1 * | 10/2011 | Weaver ................ G06F 3/0446 29/829 |
| 2015/0075846 A1 | 3/2015 | Yoshiki |

FOREIGN PATENT DOCUMENTS

| CN | 108984010 A | * 12/2018 | ........... G06F 3/0412 |
| JP | 5876351 B2 | 3/2016 | |

* cited by examiner

*Primary Examiner* — David D Davis
(74) *Attorney, Agent, or Firm* — Edwards Neils LLC; Jean C. Edwards, Esq.

(57) ABSTRACT

Provided are a touch sensor that can suppress shading unevenness of a touch detection electrode, and a method for producing the touch sensor.

The touch sensor comprises a substrate and conductive layers formed on the substrate, in which the conductive layer has a touch detection electrode (11) that is composed of a plurality of fine metal wires arranged in a mesh shape and extends over an electrode length L1 from a first end part (11A) to a second end part (11B), the plurality of the fine metal wires of the touch detection electrode each have a layer to be plated and a metal plating layer, and an average line width Hm of the layers to be plated of the plurality of the fine metal wires in a region (R1) between the first end part (11A) and a position (P1) apart from the first end part (11A) toward the second end part (11B) side by 1/10 of the electrode length L1 is narrower than an average line width Hs of the layers to be plated of the plurality of the fine metal wires at a position (P2) apart from the first end part (11A) toward the second end part (11B) side by ½ of the electrode length L1.

6 Claims, 4 Drawing Sheets

DISTANCE FROM THE FIRST END

TOUCH SENSOR HAVING A TOUCH DETECTION ELECTRODE COMPOSED OF FINE METAL WIRES

CROSS-REFERENCE TO RELATED APPLICATIONS

The present application claims priority under 35 U.S.C. § 119 to Japanese Patent Application No. 2023-043909, filed on Mar. 20, 2023. The above application is hereby expressly incorporated by reference, in its entirety, into the present application.

BACKGROUND OF THE INVENTION

1. Field of the Invention

The present invention relates to a touch sensor that detects a touch operation.

2. Description of the Related Art

In the related art, in various electronic apparatuses including portable information apparatuses such as a tablet-type computer and a smartphone, a touch sensor that detects a so-called touch operation of allowing a finger, a stylus pen, or the like to contact or approach a screen has been used.

This touch sensor has a mesh-like touch detection electrode formed of a plurality of fine metal wires, a peripheral wiring drawn out from the touch detection electrode, and an electrode pad connected to the peripheral wiring in many cases, for example, as disclosed in JP5876351B. In JP5876351B, the touch detection electrode, the peripheral wiring, and the electrode pad are formed using a so-called plating method.

SUMMARY OF THE INVENTION

As disclosed in JP5876351B, in a case where a touch detection electrode, a peripheral wiring, and an electrode pad are formed using a plating method, for example, a layer to be plated having a pattern corresponding to the touch detection electrode, the peripheral wiring, and the electrode pad is formed on a substrate, and then the substrate is immersed in a plating liquid, whereby the plating treatments on the touch detection electrode, the peripheral wiring, and the electrode pad are performed at one time. In this case, the line width of a metal plating layer formed by plating may be non-uniform, depending on these pattern shapes. Therefore, in a case where an observer visually recognizes a mesh-like touch detection electrode, shading unevenness may occur.

The present invention has been made in order to solve the problems as described above, and has an object to provide a touch sensor that can suppress shading unevenness of a touch detection electrode, and a method for producing the touch sensor.

According to the following configuration, the object can be accomplished.

[1] A touch sensor comprising:
a substrate; and
conductive layers formed on the substrate,
wherein the conductive layer has
a touch detection electrode that is composed of a plurality of fine metal wires arranged in a mesh shape and extends over a determined electrode length L1 from a first end part to a second end part along a determined extension direction,
a connection terminal electrically connected to the first end part of the touch detection electrode, and
a peripheral wiring electrically connected to the connection terminal,
the plurality of the fine metal wires of the touch detection electrode each has a layer to be plated and a metal plating layer covering the layer to be plated, and
an average line width Hm of the layers to be plated of the plurality of the fine metal wires in a region between the first end part and a position apart from the first end part toward a second end part side along the extension direction by $1/10$ of the electrode length L1 is narrower than an average line width Hs of the layers to be plated of the plurality of the fine metal wires at a position apart from the first end part toward the second end part side along the extension direction by $1/2$ of the electrode length L1.

[2] The touch sensor according to [1],
wherein the average line width Hm and the average line width Hs in the layers to be plated satisfy a relationship of $$Hs \times 0.80 \leq Hm < Hs \times 0.90.$$

[3] The touch sensor according to [1] or [2],
wherein a ratio Ms/Hs, which is a ratio of an average line width Ms of the plurality of the fine metal wires at a position apart from the first end part toward the second end part side along the extension direction by $1/2$ of the electrode length L1 to the average line width Hs of the layers to be plated, is from 1.25 to 1.60.

[4] The touch sensor according to [3],
wherein the average line width Ms of the plurality of the fine metal wires is from 1.50 μm to 2.00 μm.

[5] The touch sensor according to [3],
wherein the ratio Ms/Hs, which is the ratio of the average line width Ms of the plurality of the fine metal wires to the average line width Hs of the layers to be plated, is from 1.25 to 1.45.

According to the touch sensor of the present invention, the shading unevenness of the touch detection electrode is suppressed.

DESCRIPTION OF THE PREFERRED EMBODIMENTS

Hereinafter, a conductive member for a touch panel and a touch panel according to embodiments of the present invention will be described in detail, based on suitable embodiments shown in the accompanying drawings.

Furthermore, in the following, a notation using "to" between numbers indicating a numerical range is intended to include the numerical values described on both sides. For example, an expression that "s is a numerical value t1 to a numerical value t2" means that a range of s is a range including the numerical value t1 and the numerical value t2, and denotes t1≤s≤t2 as expressed in mathematical symbols.

Unless otherwise specified, the meaning of an angle such as a term "perpendicular" or "parallel" includes a case where an error range is generally allowable in the technical field.

A term "transparent" indicates that a light transmittance in a visible wavelength range of 400 to 800 nm is at least 40% or more, preferably 75% or more, more preferably 80% or more, and still more preferably 90% or more. The light transmittance is measured using "Plastics-Determination of Total Luminous Transmittance And Reflectance" defined by JIS K 7375:2008.

EMBODIMENTS

Figure 1:
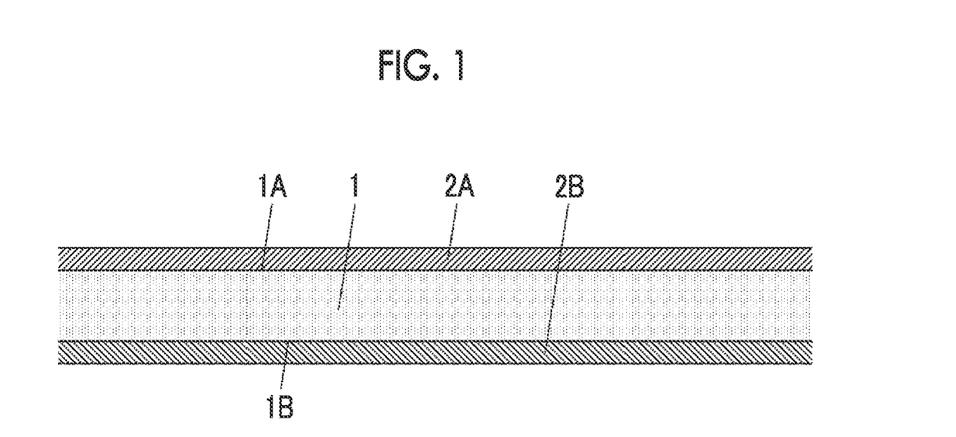
FIG. 1 is a partial cross-sectional view showing a touch sensor according to an embodiment.

FIG. 1 shows a configuration of a touch sensor according to an embodiment of the present invention.

The touch sensor comprises a substrate 1 having a first surface 1A and a second surface 1B forming the front and the back from each other, a first conductive layer 2A disposed on the first surface 1A of the substrate 1, and a second conductive layer 2B disposed on the second surface 1B of the substrate 1. The substrate 1 has insulating properties, and the first conductive layer 2A and the second conductive layer 2B are electrically insulated from each other. In addition, the substrate 1 has flexibility, and the touch sensor has flexibility conforming to the flexibility of the substrate 1. In addition, the substrate 1 is composed of a transparent material.

The touch sensor has a cover member not shown that is bonded to a surface on the first conductive layer 2A side, and a display module not shown that is bonded to a surface on the second conductive layer 2B side, and as a result, it can be used as a touch panel display device not shown. In this case, a finger, a stylus pen, or the like of a user that contacts or approaches the cover member is detected, and a touch operation by the user is detected.

Figure 2:
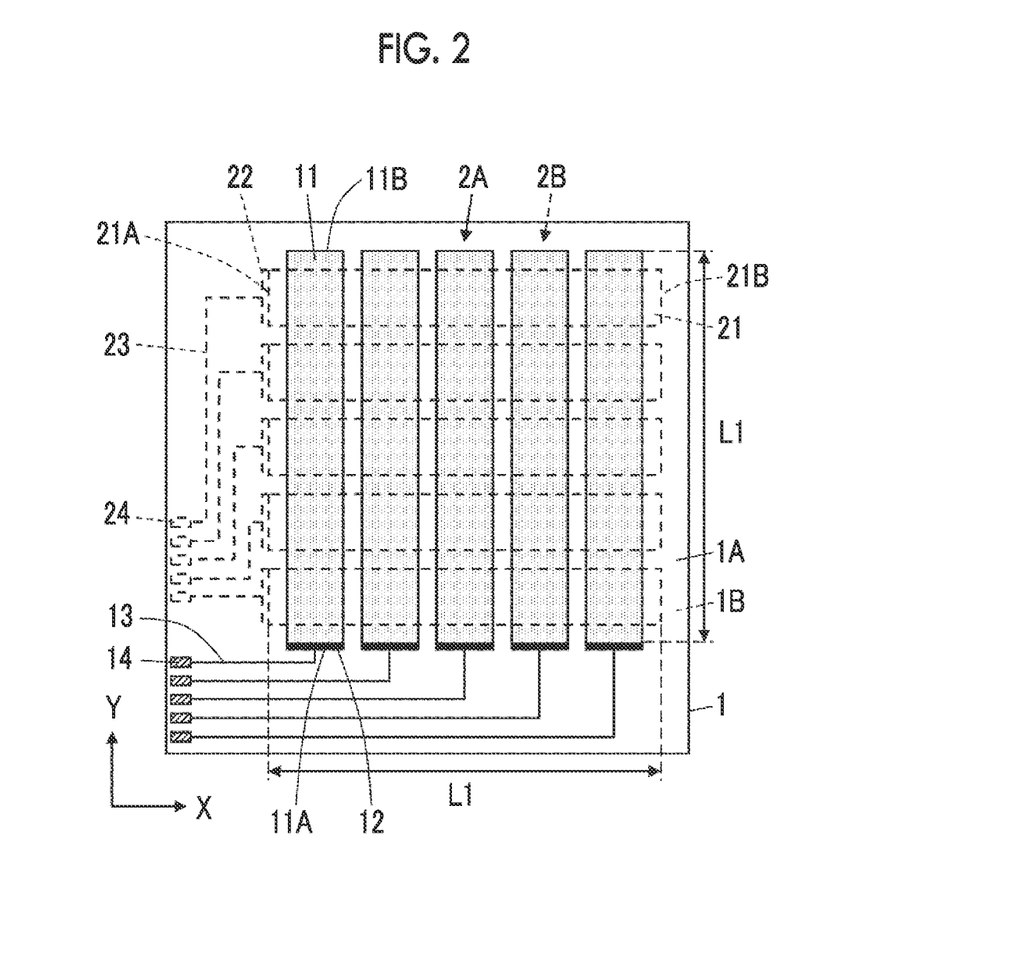
FIG. 2 is a plan view of the touch sensor according to the embodiment.

FIG. 2 is a plan view showing the touch sensor.

The first conductive layer 2A has a plurality of touch detection electrodes 11 for detecting a touch operation, which extend from the first end part 11A to the second end part 11B over a determined electrode length L1 along a Y direction that is a determined extension direction, and are arranged along a X direction perpendicular to the Y direction, a plurality of connection terminals 12 electrically connected to the first end parts 11A of the plurality of the touch detection electrodes 11, a plurality of peripheral wirings 13 electrically connected to the plurality of the connection terminals 12, and a plurality of connection pads 14 electrically connected to the plurality of peripheral wirings 13. The plurality of connection pads 14 are used to be electrically connected to an external device not shown.

The second conductive layer 2B has a plurality of touch detection electrodes 21 for detecting a touch operation, which extend from the first end part 21A to the second end part 21B over a determined electrode length L1 along an X direction that is a determined extension direction, and are arranged along a Y direction, a plurality of connection terminals 22 electrically connected to the first end parts 21A of the plurality of the touch detection electrodes 21, a plurality of peripheral wirings 23 electrically connected to the plurality of the connection terminals 22, and a plurality of connection pads 24 electrically connected to the plurality of peripheral wirings 23. The plurality of the connection pads 24 are used to be electrically connected to an external device not shown.

A region where the plurality of the touch detection electrodes 11 of the first conductive layer 2A are arranged and a region where the plurality of the touch detection electrodes 21 of the second conductive layer 2B are arranged overlap each other, with the substrate 1 sandwiched therebetween in a Z direction perpendicular to both of the X direction and the Y direction.

Figure 3:
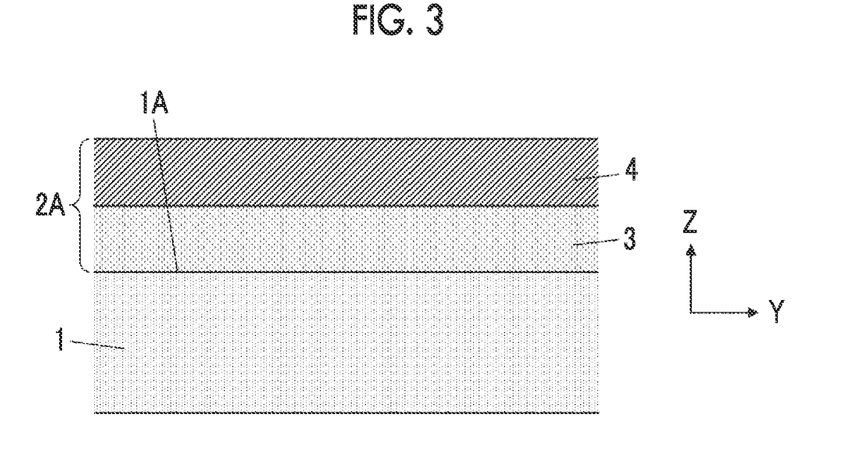
FIG. 3 is an enlarged cross-sectional view showing a part of a first conductive layer according to the embodiment.

The first conductive layer 2A is formed by a so-called plating method. As shown in FIG. 3, the first conductive layer 2A has a layer 3 to be plated that is formed on the first surface 1A of the substrate 1, and a metal plating layer 4 that is formed by plating the layer 3 to be plated and covers the layer 3 to be plated.

Figure 4:
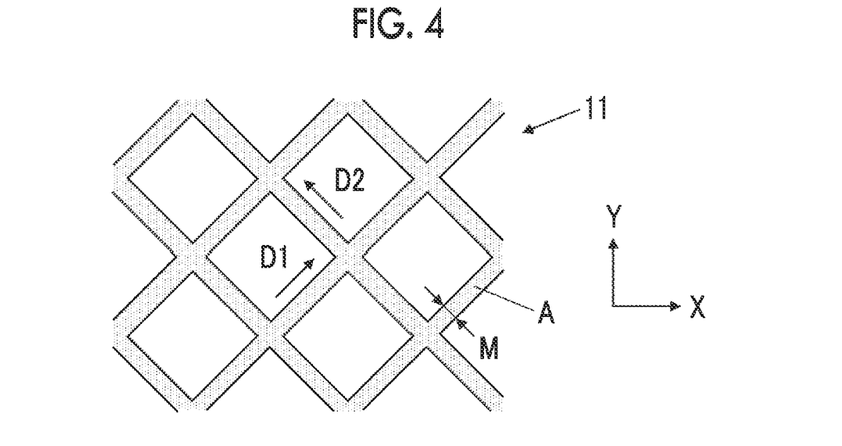
FIG. 4 is an enlarged plan view showing a part of a plurality of fine metal wires of a touch detection electrode according to the embodiment.

As shown in FIG. 4, the touch detection electrode 11 is composed of a plurality of fine metal wires A that are arranged in a mesh shape along a first direction D1 and a second direction D2. An angle formed between the first direction D1 and the second direction D2 is not particularly limited, but in the following description, the first direction D1 and the second direction D2 are assumed to be perpendicular to each other for simplification of description.

The fine metal wire A has a line width M in a direction perpendicular to the first direction D1 or the second direction D2 in which the fine metal wire A extends, that is, in the second direction D2 or the first direction D1.

Figure 5:
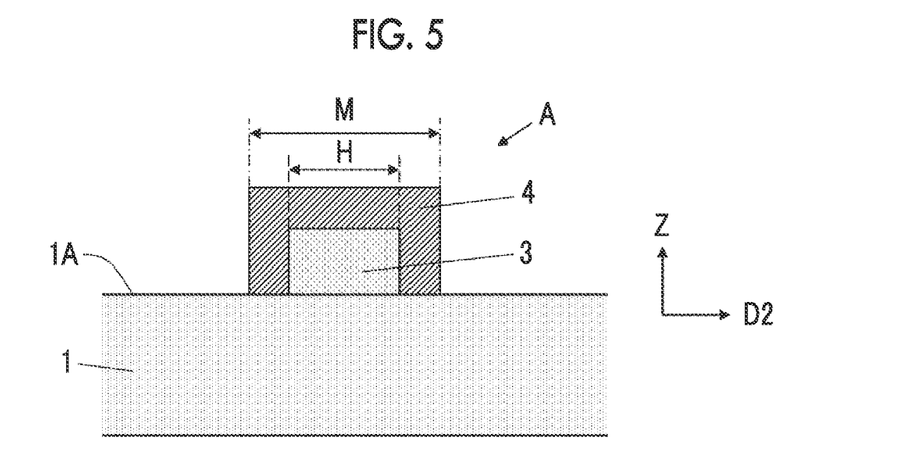
FIG. 5 is a cross-sectional view showing the fine metal wire of the touch detection electrode according to the embodiment.

As shown in FIG. 5, the fine metal wire A includes a layer 3 to be plated that is formed on the first surface 1A of the substrate 1 and extends along the first direction D1 or the second direction D2, and a metal plating layer 4 covering the layer 3 to be plated. The fine wire-like layer 3 to be plated has a line width H in a direction perpendicular to the first direction D1 or the second direction D2 in which the layer 3 to be plated extends, that is, in the second direction D2 or the first direction D1. Here, FIG. 5 shows a cross-section of the fine metal wire A that extends along the first direction D1, taken along a D2-Z plane.

Incidentally, in a case where the layer 3 to be plated is subjected to a plating treatment, the substrate 1 on which the layer 3 to be plated has been formed is immersed in a plating liquid that includes metal ions to be precipitated and a reducing agent for reducing the metal ions to a metal. In this case, the line width and the thickness of the metal plating layer 4 is adjusted depending on the composition of the plating liquid, the plating temperature, the plating time, and the like.

In a case where the layer 3 to be plated of the touch detection electrode 11 has the same line width H over an entirety thereof, the line width M of the metal plating layer 4 in the touch detection electrode 11 is non-uniform by subjecting the layer 3 to be plated having a large difference in pattern shape to a plating treatment as in the layer 3 to be plated corresponding to the touch detection electrode 11 and the layer 3 to be plated corresponding to the peripheral wiring 13, whereby shading unevenness occurred sometimes in a case where an observer visually recognized the touch detection electrode 11.

Figure 6:
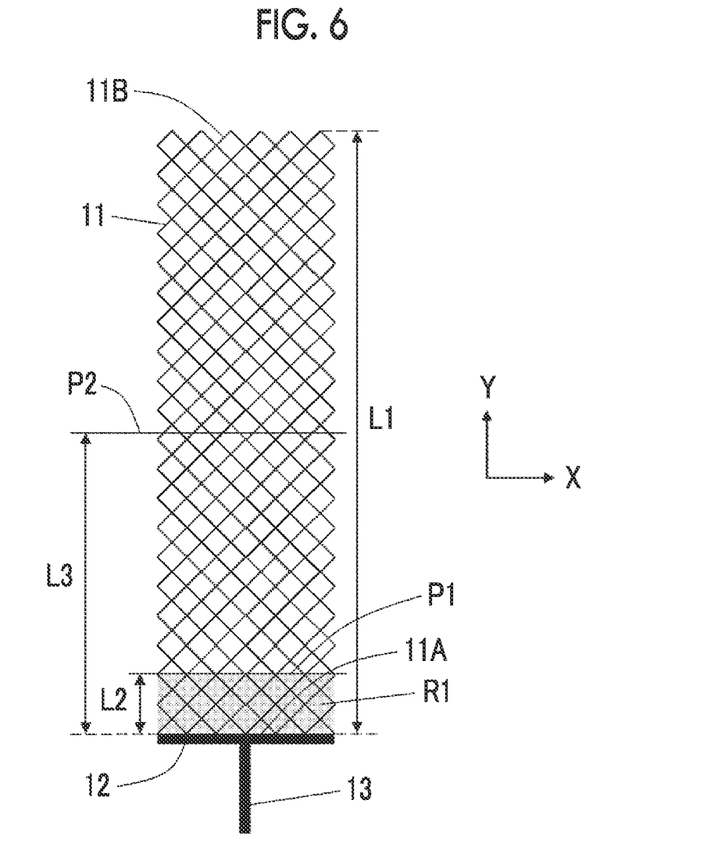
FIG. 6 is an enlarged plan view showing a part of a touch detection electrode according to the embodiment.

Here, in the touch sensor of the embodiment of the present invention, as shown in FIG. 6, an average line width Hm of the layers 3 to be plated of the plurality of the fine metal wires A in a region R1 between a first end part 11A and a position P1 apart from the first end part 11A toward a second end part 11B side along a Y direction by a length L2 which is 1/10 of the electrode length L1 is narrower than an average line width Hs of the layers 3 to be plated of the plurality of the fine metal wires A at a position P2 apart from the first end part 11A toward a second end part 11B side along the Y direction by a length L3 which is ½ of the electrode length L1.

Furthermore, the average line width Hm of the layers 3 to be plated of the plurality of the fine metal wires A in the region R1 can be calculated, for example, by further dividing the region R1 into a plurality of partial regions, for example, five partial regions along the Y direction, measuring the line widths H of the layers 3 to be plated at a plurality of locations such as two locations in the partial region, and determining an arithmetic mean of all the measured line widths H. In addition, the average line width Hs of the layers 3 to be plated of the plurality of the fine metal wires A at the position P2 can be obtained, for example, by measuring the line widths H of the layers 3 to be plated at a plurality of positions, for example, at least two positions in the position P2, and determining an arithmetic mean of all the measured line widths H.

The present inventors have found that in such a manner, the line widths M of the plurality of the fine metal wires A finally formed by a plating treatment are uniform over the entire touch detection electrode 11 by making the average line width Hm of the layers 3 to be plated of the plurality of the fine metal wires A in the region R1 be narrower than the average line width Hs of the layers 3 to be plated of the plurality of the fine metal wires A at the position P2, and thus, the shading unevenness in a case where an observer visually recognizes the touch detection electrode 11 is suppressed.

Figure 7:
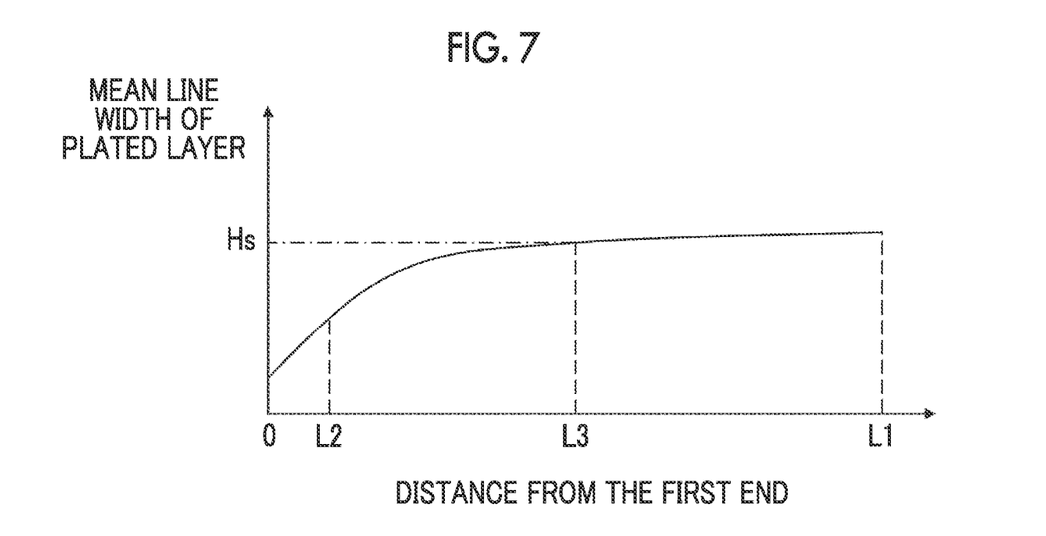
FIG. 7 is a graph showing an example of a relationship between a distance from a first end part and an average line width of a layer to be plated in the embodiment.

The average line width Hm of the layers 3 to be plated in the region R1 can be made narrower than the average line width Hs of the layers 3 to be plated at the position P2, for example, by performing a design so that the average line width of the layers 3 to be plated of the plurality of the fine metal wires A increases from the first end part 11A toward the second end part 11B as shown in FIG. 7. Here, FIG. 7 shows an example of a relationship between a distance from the first end part 11A to a position apart toward the second end part 11B side along the Y direction which is an extension direction of the touch detection electrode 11, and the average line width of the layers 3 to be plated at the position. Furthermore, the line widths M of the fine metal wires A tend to be wider in the vicinity of a connection terminal 12 than in the center part of the touch detection electrode 11. Therefore, in order to make the line widths M of the fine metal wires A uniform over the entire touch detection electrode 11, it is preferable to design the line width H of the layer 3 to be plated, for example, so that the line width H of the layer 3 to be plated is steeply changed from the first end part 11A to a position of about twice the length L2, and the line width H from then on to the second end part 11B is gently changed.

Further, it is possible to form the plurality of the fine metal wires A more uniformly over the touch detection electrode 11 by making the average line width Hm of the layers 3 to be plated in the region R1 and the average line width Hs of the layers 3 to be plated at the position P1 satisfy a relationship of Inequality (1) below.

$$Hs \times 0.80 \le Hm < Hs \times 0.90 \quad (1)$$

In addition, as the amount of a metal precipitated in the layer 3 to be plated increases, the electric resistance of the touch detection electrode 11 decreases, and the sensitivity of the touch detection improves. On the other hand, a stress applied to the metal plating layer 4 increases and the metal plating layer 4 is easily peeled off from the substrate 1. From this viewpoint, a ratio Ms/Hs of an average line width Ms of the plurality of the fine metal wires A at the position P2 apart from the first end part 11A toward the second end part 11B side along the Y direction by the length L3 which is ½ of the electrode length L1 to the average line width Hs of the layers 3 to be plated at the position P1 is preferably from 1.25 to 1.60, and more preferably from 1.25 to 1.45.

In addition, from the same viewpoint, the average line width Ms of the plurality of the fine metal wires A is preferably from 1.50 μm to 2.00 μm.

Furthermore, the average line width of the plurality of the fine metal wires A at a position apart from the first end part 11A by a specific distance can be calculated, for example, by determining an arithmetic mean of the line widths M of the fine metal wires A at a plurality of randomly selected locations, for example, 10 points at that position.

Furthermore, although not shown, as in the touch detection electrode 11 in the first conductive layer 2A, the touch detection electrode 21 in the second conductive layer 2B is also composed of a plurality of fine metal wires A arranged in a mesh shape, and the average line width Hm of the layers 3 to be plated in the region R1 from the first end part 21A to the position P1 apart from each other by the length L2 is narrower than the average line width Hs of the layers 3 to be plated at the position P2 apart from the first end part 21A by the length L3.

Therefore, in the same manner as in the touch detection electrode 11 of the first conductive layer 2A, in the touch detection electrode 21 of the second conductive layer 2B, the line widths M of a plurality of fine metal wires A finally formed by a plating treatment are uniform over the entire touch detection electrode 21, and the shading unevenness in a case where an observer visually recognizes the touch detection electrode 21 is suppressed.

As described above, with the touch sensor according to the embodiment of the present invention, the average line width Hm of the layers 3 to be plated of the plurality of the fine metal wires A in a region R1 between a first end part 11A and a position P1 apart from the first end part 11A toward a second end part 11B side along a Y direction by 1/10 of the electrode length L1 is narrower than an average line width Hs of the layers 3 to be plated of the plurality of the fine metal wires A at a position P2 apart from the first end part 11A toward a second end part 11B side along the Y direction by ½ of the electrode length L1. Therefore, the line widths M of the fine metal wires A are uniformly formed over the entire touch detection electrode 11, and the shading unevenness in a case where an observer visually recognizes the touch detection electrode 11 can be suppressed.

Furthermore, although an example in which the average line width of the layers 3 to be plated of the plurality of the fine metal wires A continuously and monotonically increases from the first end part 11A toward the second end part 11B has been described with reference to FIG. 7, for example, the average line width of the layers 3 to be plated of the plurality of the fine metal wires A may increase in a so-called stepwise shape from the first end part 11A toward the second end part 11B. Even in this case, the shading unevenness in a case where an observer visually recognizes the touch detection electrode 11 can be suppressed by making the average line width Hm of the fine wire-like layers 3 to be plated in the region R1 narrower than the average line width Hs of the fine wire-like layer 3 to be plated at the position P2.

Figure 8:
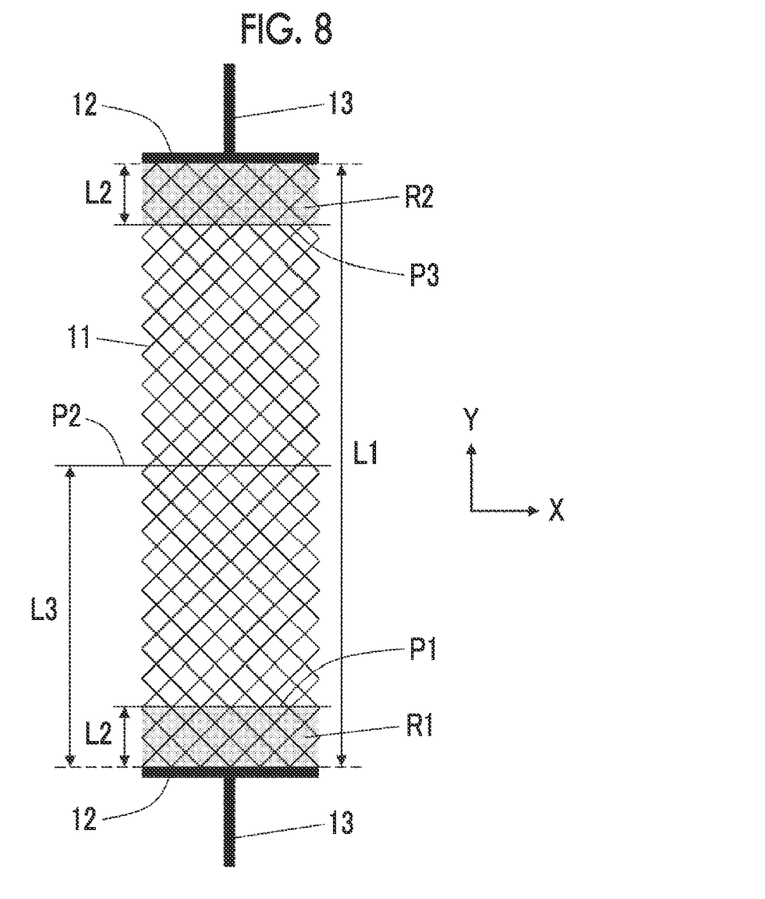
FIG. 8 is a plan view showing a touch detection electrode according to a modification example of the embodiment.

In addition, although it has been described that the connection terminal 12 is formed on the first end part 11A of the touch detection electrode 11, the connection terminal 12 can also be further formed on the second end part 11B, for example, as shown in FIG. 8. In this case, the average line width Hm of the layers 3 to be plated of the plurality of the fine metal wires A in the region R1 between the first end part 11A and the position P1 apart from the first end part 11A toward the second end part 11B side along the Y direction by the length L2, or in a region R2 between second end part 11B and the position P3 apart from the second end part 11B toward the first end part 11A side along the Y direction by the length L2 is narrower than the average line width Hs of the layers 3 to be plated of the plurality of the fine metal wires A at the position P2 apart from the first end part 11A toward the second end part 11B side by the length L3.

Also in this case, as in a case where the connection terminal 12 is formed only on the first end part 11A, the line widths M of the plurality of the fine metal wires A finally formed by a plating treatment are uniform over the entire touch detection electrode 11, and thus, the shading unevenness in a case where an observer visually recognizes the touch detection electrode 11 is suppressed.

Figure 9:
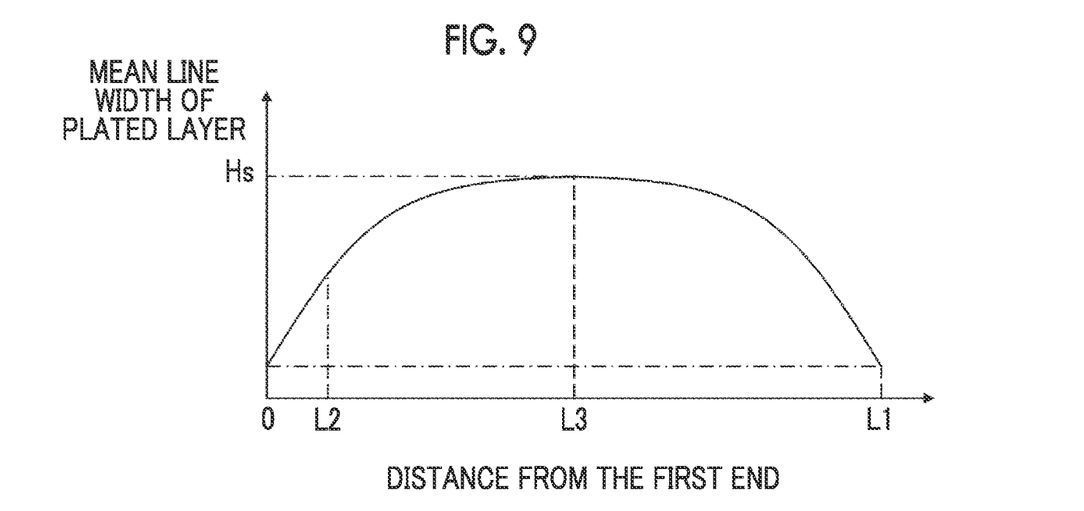
FIG. 9 is a graph showing an example of a relationship between a distance from a first end part and an average line width of a layer to be plated in a modification example of the embodiment.

Moreover, for example, as shown in FIG. 9, the average line width Hm of the layers 3 to be plated in the region R1 can be made narrower than the average line width Hs of the layers 3 to be plated at the position P2 by performing a design such that the average line width of the layers 3 to be plated monotonically increases in the range from the first end part 11A to the position P2 apart from the first end part 11A by the length L3 over the Y direction, and the average line width of the layers 3 to be plated monotonically decreases in the range from the position P3 to a position apart from the first end part 11A by the electrode length L1 along the Y direction, that is, to the second end part 11B. Furthermore, the line width M of the fine metal wire A tends to be wider in the vicinity of a connection terminal 12 than in the center part of the touch detection electrode 11. Therefore, in order to make the line width M of the fine metal wire A uniform over the entire touch detection electrode 11, it is preferable to design the line width H of the layer 3 to be plated, for example, so that the line width H of the layer 3 to be plated is steeply changed from the first end part 11A and the second end part 11B to a position of about twice the length L2, and the line width H from then on to the center part of the touch detection electrode 11 is gently changed.

Hereinafter, a method for producing the touch sensor of the embodiment will be described.

First, a transparent substrate 1 is prepared, and a layer 3 to be plated is formed on a first surface 1A of the substrate 1, as shown in FIG. 3 and FIG. 6 using, for example, a photolithography method. The layer 3 to be plated has shapes corresponding to the touch detection electrode 11, the connection terminal 12, the peripheral wiring 13, and the connection pad 14.

Here, as shown in FIG. 4, a design is performed such that an average line width Hm of the layers 3 to be plated of the plurality of the fine metal wires A in a region R1 between a first end part 11A and a position P1 apart from the first end part 11A toward a second end part 11B side along a Y direction by a length L2 which is ⅒ of the electrode length L1 is narrower than an average line width Hs of the layers 3 to be plated of the plurality of the fine metal wires A at a position P2 apart from the first end part 11A toward a second end part 11B side along the Y direction by a length L3 which is ½ of the electrode length L1. Furthermore, although not shown, a layer 3 to be plated having the same configuration as the layer 3 to be plated that is formed on the first surface 1A of the substrate 1 is formed on the second surface 1B of the substrate 1.

Next, in a state where the substrate 1, in which the layers 3 to be plated are each formed on the first surface 1A and the second surface 1B, is immersed in a plating liquid, the layers 3 to be plated are subjected to a plating treatment. As a result, for example, as shown in FIG. 3 and FIG. 6, the metal is precipitated on the layers 3 to be plated to form the metal plating layers 4. Thus, the touch sensor is produced.

Hereinafter, each of the members constituting the touch sensor according to embodiment will be described.

Substrate 1

The kind of the substrate 1 is not particularly limited as long as it is a member that can support the first conductive layer 2A and the second conductive layer 2B. Examples of the substrate 1 include a plastic substrate, a glass substrate, and a metal substrate, among which the plastic substrate is preferable.

As the substrate 1, a substrate having flexibility is preferable from the viewpoint of excellent bendability. Examples of the substrate having flexibility include the plastic substrate.

The thickness of the substrate 1 is not particularly limited and is likely to be 25 μm to 500 μm.

As a material constituting the substrate 1, a resin having a melting point of about 290° C. or lower such as polyethylene terephthalate (PET) (258° C.), polycycloolefin (134° C.), polycarbonate (250° C.), an acrylic film (128° C.), polyethylene naphthalate (269° C.), polyethylene (135° C.), polypropylene (163° C.), polystyrene (230° C.), polyvinyl chloride (180° C.), polyvinylidene chloride (212° C.), or triacetyl cellulose (290° C.) is preferable, and PET, polycycloolefin, or polycarbonate is more preferable. Among these, PET is preferable from the viewpoint of excellent adhesiveness between the first conductive layer 2A and the second conductive layer 2B. The numerical value in the brackets is the melting point or the glass transition temperature.

The total light transmittance of the substrate 1 is preferably 85% to 100%. The total light transmittance is measured using "Plastics-Determination of Total Luminous Transmittance and Reflectance" defined by Japanese Industrial Standards (JIS) K 7375:2008.

Examples of a suitable aspect of the substrate 1 include a treated substrate that undergoes at least one treatment selected from the group consisting of an atmospheric pressure plasma treatment, a corona discharge treatment, and an ultraviolet irradiation treatment. By performing the above-described treatment, a hydrophilic group such as an OH group is introduced into the treated surface of the substrate 1 such that the adhesiveness between the substrate 1 and the first conductive layer 2A and the adhesiveness between the substrate 1 and the second conductive layer 2B are improved. In addition, the atmospheric pressure plasma treatment is preferable among the above-described treatments from the viewpoint of further improving the adhesiveness between the substrate 1 and the first conductive layer 2A and the adhesiveness between the substrate 1 and the second conductive layer 2B.

Undercoat Layer

In order to improve the adhesiveness between the substrate 1 and the first conductive layer 2A and the adhesiveness between the substrate 1 and the second conductive layer 2B, an undercoat layer can also be disposed between the substrate 1 and the first conductive layer 2A and between the substrate 1 and the second conductive layer 2B. This undercoat layer includes a polymer such that the adhesiveness between the substrate 1 and the first conductive layer 2A and the adhesiveness between the substrate 1 and the second conductive layer 2B are further improved.

A method for forming the undercoat layer is not particularly limited, and examples thereof include a method of applying a composition for forming an undercoat layer including a polymer to the substrate and optionally performing a heat treatment thereon. In addition, for example, gelatin, an acrylic resin, a urethane resin, or an acrylic styrene latex including fine particles of an inorganic material or a polymer may be used as a composition for forming the undercoat layer, including a polymer.

Furthermore, the touch sensor may comprise a refractive index adjusting layer, as a layer other than the above-described undercoat layer, between the substrate 1 and the first conductive layer 2A and between the substrate 1 and the second conductive layer 2B. For example, an organic layer to which particles of a metal oxide such as zirconium oxide that adjusts a refractive index has been added can be used as the refractive index adjusting layer, as necessary.

First Conductive Layer and Second Conductive Layer

The first conductive layer 2A and the second conductive layer 2B has a metal or an alloy as a material forming the layer, and can be formed of, for example, silver, copper, gold, aluminum, nickel, chromium, molybdenum, or tungsten. The first conductive layer 2A and the second conductive layer 2B preferably include copper, but may include a metal other than copper, for example, gold or silver. In addition, the first conductive layer 2A and the second conductive layer 2B may have a laminated structure of a metal and a metal compound, and a fine metal wire having a laminated structure such as copper/copper oxide or copper/copper sulfide can be used.

Next, a method for forming the first conductive layer 2A and the second conductive layer 2B will be described. As the method for forming those layers, a plating method can be used as appropriate.

A method for forming the first conductive layer 2A and the second conductive layer 2B using a plating method will be described. Examples thereof include a method, in which a layer 3 to be plated in which a photosensitive polymer containing plating catalytic metal particles has been patterned by a photolithography method is subjected to a plating treatment, and a method in which a photosensitive polymer having a functional group is patterned by a photolithography method and then a layer 3 to be plated having a catalytic metal supported on a functional group is subjected to a plating treatment by performing a treatment with a solution including catalytic metal ions.

EXAMPLES

Example 1

The present invention will be described in more detail based on the following examples. Materials, used amounts, ratios, treatment details, and treatment procedures shown in the following examples can be modified as appropriate changed within a range not departing from the scope of the present invention. Thus, the scope of the present invention is not limited to the following examples.

Preparation of Composition for Forming Layer to be Plated

The following respective components were mixed to obtain a composition for forming a layer to be plated.

| | |
|---|---|
| Isopropanol | 38 parts by mass |
| Polybutadiene maleic acid (butadiene-maleic acid alternating copolymer, repeating units derived from butadiene:repeating units derived from maleic acid = 1:1 (molar ratio), manufactured by Polysciences, Inc.) | 4 parts by mass |
| FAM-201 (bifunctional acrylamide, manufactured by FUJIFILM Wako Pure Chemical Corporation) | 1 part by mass |
| IRGACURE-OXE02 (Oxime ester-based polymerization initiator, manufactured by BASF) | 0.05 parts by mass |

Manufacture of Substrate with Precursor Layer of Layer to Be Plated

As a substrate, a polyester film (COSMOSHINE (registered trademark) A4360, manufactured by TOYOBO Co., Ltd.) with easy-adhesive layers on both sides, having a thickness of 50 µm, was prepared. The composition for forming a layer to be plated was applied with a bar on one surface of the substrate such that the thickness was about 0.3 µm. After the application of the composition, the composition was dried at a temperature of 120° C. for 1 minute to obtain a substrate with a precursor layer of a layer to be plated. Then, a protective film made of polypropylene having a thickness of 12 µm was bonded to the surface of the precursor layer of a layer to be plated.

Manufacture of Substrate with Layer to Be Plated

An exposure mask having exposure patterns corresponding to a plurality of touch detection electrodes 11, a plurality of connection terminals 12, a plurality of peripheral wirings 13, and a plurality of connection pads 14 was disposed on the substrate with the precursor of the layer to be plated, to which the protective film had been bonded, as shown in FIG. 2.

In the exposure pattern corresponding to the touch detection electrode 11, the exposure pattern corresponding to the touch detection electrode 11 had a square mesh-like opening pattern (pitch of 300 µm). In addition, the line width of the pattern corresponding to the plurality of the fine metal wires A was 1.15 µm in the first end part 11A, was gradually widened from the first end part 11A toward the second end part 11B, and was 1.35 µm at the position P1 apart by the length L3 of ½ of the touch detection electrode 11.

Next, the substrate with a precursor layer of a layer to be plated was irradiated with UV light at 30 mJ/cm² using a high-pressure mercury lamp through an exposure mask. After the irradiation with UV light, the protective film was peeled off from the substrate with the precursor layer of a layer to be plated. The substrate with the precursor layer of a layer to be plated, from which the protective film had been peeled off, was shower-washed with a 1% by mass aqueous sodium carbonate solution and subjected to an alkali development treatment to obtain a substrate with a mesh-like layer to be plated. The formed layer to be plated had shapes corresponding to the touch detection electrode 11, the connection terminal 12, the peripheral wiring 13, and the connection pad 14.

The average line width Hm of the layers to be plated of the plurality of the fine metal wires in the region R1 between a portion corresponding to the first end part 11A and the position P1 apart from the portion corresponding to the first end part 11A toward the second end part 11B side along the Y direction by the length L2 which is 1/10 of the entire electrode length L1 of the portion corresponding to the touch detection electrode 11 was 1.20 μm. In addition, the average line width Hs of the layers to be plated of the plurality of the fine metal wires A at the position P2 apart from the portion corresponding to the first end part 11A toward the second end part 11B side along the Y direction by the length L3 which is ½ of the electrode length L1 was 1.40 μm.

Here, the average line width Hm was calculated by dividing the region R1 into five divided regions along the Y direction, measuring the line widths H of the fine wire-like layer to be plated, positioned in at least 2 locations in each divided region, and determining an arithmetic mean of the line widths H at a total of 10 or more locations. In addition, the average line width Hs was calculated by measuring the line widths H of the fine wire-like layers to be plated in at least 2 locations at the position P2, and determining an arithmetic mean of the values of the line widths H.

Manufacture of Substrate (Touch Sensor) with Copper Plating Layer

A Pd catalyst-imparting liquid Omnishield 1573 activator (manufactured by Rohm and Haas Electronic Materials LLC) was diluted with pure water to 5.4% by volume, and the substrate with the layer to be plated was immersed in an aqueous solution with a pH (hydrogen ion exponent) adjusted to 4 with 0.1 N hydrochloric acid at a temperature of 50° C. for 10 minutes. Thereafter, the substrate with the layer to be plated was washed twice with pure water.

Next, the substrate with the layer to be plated was immersed in a 0.8% by volume aqueous solution of a reducing agent CIRCUPOSIT PB Oxide Converter 60C (manufactured by Rohm and Haas Electronic Materials LLC) at a temperature of 30° C. for 5 minutes. Thereafter, the substrate with the layer to be plated was washed twice with pure water and subjected to a Pd catalyst treatment. Next, the substrate with the layer to be plated which had been subjected to the Pd catalyst treatment was immersed in an electroless plating liquid obtained by mixing 12% by volume of an M agent, 6% by volume of an A agent, and 10% by volume of a B agent of CIRCUPOSIT 4500 (manufactured by Rohm and Haas Electronic Materials LLC) at a temperature of 50° C. for 40 minutes. Thereafter, the substrate with the layer to be plated was washed with pure water to form a copper plating layer covering the layer to be plated as a metal plating layer, thereby obtaining a substrate (touch sensor) with the copper plating layer. The touch sensor thus obtained had the first conductive layer 2A including a plurality of touch detection electrodes 11; a plurality of connection terminals 12; a plurality of peripheral wirings 13; and a plurality of connection pads 14, for example, as shown in FIG. 2.

The average line width Mm of the plurality of the fine metal wires A in the region R1 of the obtained touch sensor was 2.00 μm, and the average line width Ms of the plurality of the fine metal wires A at the position P1 was 2.00 μm.

Here, the average line width Mm was calculated by dividing the region R1 into five divided regions along the Y direction, measuring the line widths M of the fine metal wires A positioned in at least 2 locations in each divided region, and determining an arithmetic mean of the line widths M at a total of 10 or more locations. In addition, the average line width Ms was calculated by measuring the line widths M of the fine metal wires A in at least 2 locations at the position P2, and determining an arithmetic mean of the values of the line widths M.

Since the average line width Hm of the layers to be plated of the plurality of the fine metal wires A was 1.20 μm and the average line width Hs thereof was 1.40 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=1.12 and the average line width Hs×0.90=1.26 were satisfied, and the average line widths Hs and Hm satisfied Inequality (1).

Example 2

A touch sensor of Example 2 was produced in the same manner as in Example 1, except that in the step of manufacturing the substrate with the layer to be plated, an exposure mask such that an average line width Hm of the fine wire-like layers to be plated in the region R1 was set to 1.08 μm was used. The average line width Mm of the plurality of the fine metal wires A in the region R1 was 1.80 μm. Since the average line width Hm of the layers to be plated of the plurality of the fine metal wires A was 1.08 μm and the average line width Hs thereof was 1.40 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=1.12 and the average line width Hs×0.90=1.26 were satisfied, and the average line widths Hs and Hm did not satisfy Inequality (1).

Example 3

A touch sensor of Example 3 was produced in the same manner as in Example 1, except that in the step of manufacturing the substrate with the layer to be plated, an exposure mask such that an average line width Hm of the fine wire-like layers to be plated in the region R1 was set to 1.32 μm was used. The average line width Mm of the plurality of the fine metal wires A in the region R1 was 2.20 μm. Since the average line width Hm of the layers to be plated of the plurality of the fine metal wires A was 1.32 μm and the average line width Hs thereof was 1.40 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=1.12 and the average line width Hs×0.90=1.26 were satisfied, and the average line widths Hs and Hm did not satisfy Inequality (1).

Example 4

A touch sensor of Example 4 was produced in the same manner as in Example 1, except that in the step of manufacturing the substrate with the layer to be plated, an exposure mask such that an average line width Hm of the fine wire-like layers to be plated in the region R1 was set to 0.48 μm and an average line width Hs of the fine wire-like layers to be plated at the position P2 was set to 0.56 μm was used, and in the step of manufacturing the substrate with a copper plating layer (touch sensor), an average line width Ms of the plurality of the fine metal wires A at the position P2 was set to 0.80 μm.

The average line width Mm of the plurality of the fine metal wires A in the region R1 was 0.80 μm. Since the average line width Hm of the layers to be plated of the plurality of the fine metal wires A was 0.48 μm and the average line width Hs thereof was 0.56 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=0.45 and the average line width Hs×0.90=0.50 were satisfied, and the average line widths Hs and Hm satisfied Inequality (1).

Example 5

A touch sensor of Example 5 was produced in the same manner as in Example 1, except that in the step of manufacturing the substrate with the layer to be plated, an exposure mask such that an average line width Hm of the fine wire-like layers to be plated in the region R1 was set to 0.83 μm and an average line width Hs of the fine wire-like layers to be plated at the position P2 was set to 0.93 μm was used, and in the step of manufacturing the substrate with a copper plating layer (touch sensor), an average line width Ms of the plurality of the fine metal wires A at the position P2 was set to 1.15 μm.

The average line width Mm of the plurality of the fine metal wires A in the region R1 was 1.15 μm. Since the average line width Hm of the layers to be plated of the plurality of the fine metal wires A was 0.83 μm and the average line width Hs thereof was 0.93 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.24. In addition, the average line width Hs×0.80=0.74 and the average line width Hs×0.90=0.84 were satisfied, and the average line widths Hs and Hm satisfied Inequality (1).

Example 6

A touch sensor of Example 6 was produced in the same manner as in Example 1, except that in the step of manufacturing the substrate with the layer to be plated, an exposure mask such that an average line width Hm of the fine wire-like layers to be plated in the region R1 was set to 0.60 μm and an average line width Hs of the fine wire-like layers to be plated at the position P2 was set to 0.70 μm was used, and in the step of manufacturing the substrate with a copper plating layer (touch sensor), an average line width Ms of the plurality of the fine metal wires A at the position P2 was set to 1.00 μm.

The average line width Mm of the plurality of the fine metal wires A in the region R1 was 1.00 μm. Since the average line width Hm of the layers to be plated of the plurality of the fine metal wires A was 0.60 μm and the average line width Hs thereof was 0.70 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=0.56 and the average line width Hs×0.90=0.63 were satisfied, and the average line widths Hs and Hm satisfied Inequality (1).

Example 7

A touch sensor of Example 7 was produced in the same manner as in Example 1, except that in the step of manufacturing the substrate with the layer to be plated, an exposure mask such that an average line width Hm of the fine wire-like layers to be plated in the region R1 was set to 0.90 μm and an average line width Hs of the fine wire-like layers to be plated at the position P2 was set to 1.05 μm was used, and in the step of manufacturing the substrate with a copper plating layer (touch sensor), an average line width Ms of the plurality of the fine metal wires A at the position P2 was set to 1.50 μm.

The average line width Mm of the plurality of the fine metal wires A in the region R1 was 1.50 μm. Since the average line width Hm of the layers to be plated of the plurality of the fine metal wires A was 0.90 μm and the average line width Hs thereof was 1.05 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=0.84 and the average line width Hs×0.90=0.95 were satisfied, and the average line widths Hs and Hm satisfied Inequality (1).

Example 8

A touch sensor of Example 8 was produced in the same manner as in Example 1, except that in the step of manufacturing the substrate with the layer to be plated, an exposure mask such that an average line width Hm of the fine wire-like layers to be plated in the region R1 was set to 1.54 μm and an average line width Hs of the fine wire-like layers to be plated at the position P2 was set to 1.80 μm was used, and in the step of manufacturing the substrate with a copper plating layer (touch sensor), an average line width Ms of the plurality of the fine metal wires A at the position P2 was set to 2.50 μm.

The average line width Mm of the plurality of the fine metal wires A in the region R1 was 2.50 μm. Since the average line width Hm of the layers to be plated of the plurality of the fine metal wires A was 1.54 μm and the average line width Hs thereof was 1.80 μm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.39. In addition, the average line width Hs×0.80=1.44 and the average line width Hs×0.90=1.62 were satisfied, and the average line widths Hs and Hm satisfied Inequality (1).

Example 9

A touch sensor of Example 9 was produced in the same manner as in Example 1, except that in the step of manufacturing the substrate with the layer to be plated, an exposure mask such that an average line width Hm of the fine wire-like layers to be plated in the region R1 was set to 1.25 µm and an average line width Hs of the fine wire-like layers to be plated at the position P2 was set to 1.54 µm was used, and in the step of manufacturing the substrate with a copper plating layer (touch sensor), an average line width Ms of the plurality of the fine metal wires A at the position P2 was set to 2.50 µm.

The average line width Mm of the plurality of the fine metal wires A in the region R1 was 2.50 µm. Since the average line width Hm of the layers to be plated of the plurality of the fine metal wires A was 1.25 µm and the average line width Hs thereof was 1.54 µm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.62. In addition, the average line width Hs×0.80=1.23 and the average line width Hs×0.90=1.39 were satisfied, and the average line widths Hs and Hm satisfied Inequality (1).

Example 10

A touch sensor of Example 10 was produced in the same manner as in Example 1, except that in the step of manufacturing the substrate with the layer to be plated, an exposure mask such that an average line width Hm of the fine wire-like layers to be plated in the region R1 was set to 1.62 µm and an average line width Hs of the fine wire-like layers to be plated at the position P2 was set to 1.89 µm was used, and in the step of manufacturing the substrate with a copper plating layer (touch sensor), an average line width Ms of the plurality of the fine metal wires A at the position P2 was set to 2.70 µm.

The average line width Mm of the plurality of the fine metal wires A in the region R1 was 2.70 µm. Since the average line width Hm of the layers to be plated of the plurality of the fine metal wires A was 1.62 µm and the average line width Hs thereof was 1.89 µm, the average line width Hm was narrower than the average line width Hs. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=1.51 and the average line width Hs×0.90=1.70 were satisfied, and the average line widths Hs and Hm satisfied Inequality (1).

Comparative Example 1

A touch sensor of Comparative Example 1 was produced in the same manner as in Example 1, except that in the step of manufacturing the substrate with the layer to be plated, an exposure mask such that the line widths H of the fine wire-like layers to be plated were uniform over the entire portion corresponding to the touch detection electrode 11 and an average line width thereof was 1.40 µm was used.

The average line width Mm of the plurality of the fine metal wires A in the region R1 was 2.33 µm. The average line width Hm of the plurality of the fine metal wires A in the region R1 of the layer to be plated was the same as the average line width Hs of the layers to be plated at the position P1, and each of the average line widths was 1.40 µm. Furthermore, the ratio Ms/Hs of the average line width Ms of the plurality of the fine metal wires A to the average line width Hs of the layers to be plated of the plurality of the fine metal wires A was 1.43. In addition, the average line width Hs×0.80=1.12 and the average line width Hs×0.90=1.26 were satisfied, and the average line widths Hs and Hm did not satisfy Inequality (1).

With regard to the touch sensors of Examples 1 to 10 and Comparative Example 1 produced as above, evaluations of shading unevenness, conductivity, and adhesiveness shown below were performed.

Evaluation of Shading Unevenness

The touch sensor was disposed on black paper and light was applied to the substrate from an angle of 10 degrees to 30 degrees. In this state, the shading unevenness of the touch detection electrode was observed by visual inspection of five observers at a position apart from the front surface of the substrate by 1 m. The shading unevenness was evaluated according to the following standards and the evaluation obtained from the most observers was taken as a final evaluation result. Evaluation A is at an excellent level, Evaluation B is at a level in which there is no problem in practical use, and Evaluation C is at a level in which there is a problem in practical use.

A: No shading unevenness can be observed.
B: Slight shading unevenness can be observed.
C: Shading unevenness can be observed.

Evaluation of Conductivity

A resistance value of the touch detection electrode 11 of the touch sensor was measured by a so-called four-probe method, and a line resistance value of the touch detection electrode 11 was measured by dividing the measured resistance value by a distance between the measurement terminals. More specifically, any one fine metal wire A constituting the touch detection electrode 11 was separated from the other fine metal wires A, and four microprobes B1, B2, B3, and B4 (tungsten probes manufactured by Micro Support Co., Ltd., diameter: 0.50 µm) was brought into contact with the separated fine metal wire A. At this time, the microprobes B1 and B4 were arranged on the outermost side, and the microprobes B2 and B3 were arranged at intervals of 250.00 µm from each other between the microprobes B1 and B4. In this state, using a source meter (2400 Type General-Purpose Source Meter, a source meter manufactured by KEITHLEY Instruments, Inc.), a constant current I was applied between the microprobes B1 and B4 on the outermost side such that a voltage between the microprobes B2 and B3 was 5 m V.

Next, a resistance value R=V/I was measured, and the obtained resistance value R was divided by the distance between the microprobes B2 and B3 to calculate a line resistance value. The same operation was performed using the fine metal wires A at any 10 locations in the touch detection electrode 11, an arithmetic mean of the obtained line resistance values was calculated to calculate a final line resistance value, and the conductivity of the touch detection electrode 11 was evaluated in accordance with the following standards, based on the line resistance values. Evaluation A indicates that the conductivity of the touch detection electrode 11 is excellent, Evaluation B indicates that the conductivity of the touch detection electrode 11 is good, Evaluation C indicates that there is no practical problem in the conductivity of the touch detection electrode 11, and Evaluation D indicates that there is a practical problem in the conductivity of the touch detection electrode 11.

A: The line resistance value is less than 40 Ω/mm.
B: The line resistance value is 40 Ω/mm or more and less than 50 Ω/mm.
C: The line resistance value is 50 Ω/mm or more and less than 60 Ω/mm.

D: The line resistance value is 60 Ω/mm or more.

Evaluation of Adhesiveness

After adhering Tape 610 manufactured by 3M Company to the touch detection electrode 11, the tape was peeled off by an evaluator by hand, and it was observed whether or not the metal plating layer was attached to the peeled tape. In addition, before adhering the tape to the touch detection electrode 11 and after peeling off the tape adhered to the touch detection electrode 11, a line resistance value of the touch detection electrode 11 was measured by the same method as in the evaluation of the conductivity. Next, a resistance increase rate before and after the test was calculated from a ratio of the line resistance value before the tape was adhered to the touch detection electrode 11 to the line resistance value after the tape adhered to the touch detection electrode 11 was peeled off. The adhesiveness of the metal plating layer in the touch detection electrode 11 was evaluated according to the following standards, based on the observation results of the peeled tape and the resistance increase rate. Evaluation A indicates that the metal plating layer has excellent adhesiveness, Evaluation B indicates that the metal plating layer has good adhesiveness, Evaluation C indicates that there is no practical problem in the adhesiveness of the metal plating layer, and Evaluation D indicates that there is a practical problem in the adhesiveness of the metal plating layer.

A: The peeling of the metal plating layer could not be confirmed and the resistance increase rate was 20% or less.

B: The peeling of the metal plating layer could not be confirmed and the resistance increase rate was 50% or less.

C: The peeling of the metal plating layer could not be confirmed and the resistance increase rate was 100% or less.

D: The peeling of the metal plating layer can be confirmed.

The evaluation results for Examples 1 to 10 and Comparative Example 1 are shown in Table 1.

considered that since the line widths M of the fine metal wires A were uniform, the shading unevenness which is a problem in practical use could not be observed even in a case where the observer observed the touch detection electrode 11.

On the other hand, in the touch sensor of Comparative Example 1, the shading unevenness was evaluated as C. In the touch sensor of Comparative Example 1, it is considered that since the line widths H of the layers to be plated were uniform over the entire touch detection electrode 11, the line widths M of the plurality of the fine metal wires A finally formed were non-uniform due to being excessively widened in the vicinity of the connection terminals 12, and thus, the shading unevenness occurred to an extent that there was a practical problem in a case where an observer observed the touch detection electrode 11.

Furthermore, with regard to the evaluation of the shading unevenness, Examples 1 and 4 to 10 were evaluated as A, but Examples 2 and 3 were evaluated as B. Examples 1 and 4 to 10 satisfy Inequality (1), but Examples 2 and 3 do not satisfy Inequality (1). Therefore, in Examples 2 and 3, it is considered that the line widths M of the fine metal wires A were relatively wider in the vicinity of the connection terminals 12 than the position P1, and the shading unevenness slightly occurred.

In addition, with regard to the evaluation of the conductivity, Examples 1 to 3 and 7 to 10 were evaluated as A, Examples 4 and 5 were evaluated as C, and Example 6 was evaluated as B. In Examples 4 to 6, it is considered that since the average line width Ms of the plurality of the fine metal wires A was 0.80 μm, 1.15 μm, and 1.00 μm, which was relatively narrow, the current was relatively difficult to flow.

In addition, with regard to the evaluation of the adhesiveness, Examples 1 to 7 were evaluated as A, Example 8 was evaluated as B, and Examples 9 and 10 were evaluated as C. In Examples 8 to 10, it is considered that since the average

TABLE 1

|  | Metal plating layers | Layers to be plated | | | | Ratio | | | | |
| --- | --- | --- | --- | --- | --- | --- | --- | --- | --- | --- |
|  | Average line width Ms (μm) | Average line width Hm (μm) | Average line width Hs (μm) | Hm < Hs | of line widths Ms/Hs | Inequality (1) | Shading unevenness | Evaluation of conductivity | Evaluation of Adhesiveness |
| Example 1 | 2.00 | 1.20 | 1.40 | ○ | 1.43 | ○ | A | A | A |
| Example 2 | 2.00 | 1.08 | 1.40 | ○ | 1.43 | x | B | A | A |
| Example 3 | 2.00 | 1.32 | 1.40 | ○ | 1.43 | x | B | A | A |
| Example 4 | 0.80 | 0.48 | 0.56 | ○ | 1.43 | ○ | A | C | A |
| Example 5 | 1.15 | 0.83 | 0.93 | ○ | 1.24 | ○ | A | C | A |
| Example 6 | 1.00 | 0.60 | 0.70 | ○ | 1.43 | ○ | A | B | A |
| Example 7 | 1.50 | 0.90 | 1.05 | ○ | 1.43 | ○ | A | A | A |
| Example 8 | 2.50 | 1.54 | 1.80 | ○ | 1.39 | ○ | A | A | B |
| Example 9 | 2.50 | 1.25 | 1.54 | ○ | 1.62 | ○ | A | A | C |
| Example 10 | 2.70 | 1.62 | 1.89 | ○ | 1.43 | ○ | A | A | C |
| Comparative Example 1 | 2.00 | 1.40 | 1.40 | x | 1.43 | x | C | A | A |

As shown in Table 1, it can be seen that in the touch sensors of Examples 1 to 10, any of the evaluation results of the shading unevenness was A or B, and the shading unevenness was not a problem in practical use. In Examples 1 to 10, it is considered that since the average line width Hm of the layers to be plated of the plurality of the fine metal wires A in the region R1 was narrower than the average line width Hs of the layers to be plated of the plurality of the fine metal wires A at the position P1, the line widths M of the fine metal wires A in the touch detection electrode 11 were uniform. As described above, in Examples 1 to 10, it is line width Ms of the plurality of the fine metal wires A were 2.50 μm and 2.70 μm, which was relatively wide, a stress that acted on the metal plating layers of the fine metal wires A was relatively large, and the metal plating layers were easily peeled off from the layers to be plated. In addition, in comparison between Example 8 and Example 9, both Examples had the same average line widths Ms of the plurality of the fine metal wires A, but Example 9 had a higher ratio Ms/Hs of the average line widths Ms of the plurality of the fine metal wires to the average line width Hs of the layers to be plated of the plurality of the fine metal wires A. That is, in Example 9, it is considered that since the amount of the metal plating layer covering the fine wire-like layer to be plated was larger than that in Example 8 and a larger strain was applied onto the metal plating layer, the metal plating layer was easily peeled off.

From the results of the evaluations of the conductivity and the adhesiveness, it is considered that in order to secure the conductivity of the touch detection electrode 11 and the adhesiveness of the metal plating layer in the touch detection electrode 11, the average line width Ms of the plurality of the fine metal wires A is preferably from 1.50 μm to 2.00 μm, and the ratio Ms/Hs is preferably from 1.25 to 1.60, and more preferably from 1.25 to 1.45.

The present invention is basically configured as described above. Hereinabove, the touch sensor of the embodiment of the present invention has been described in detail. However, the present invention is not limited to the above-described embodiments, and various improvements or modifications can be made within a range not departing from the scope of the present invention.

EXPLANATION OF REFERENCES

1: substrate
1A: first surface
1B: second surface
2A: first conductive layer
2B: second conductive layer
3: layer to be plated
4: metal plating layer
11, 21: touch detection electrode
12, 22: connection terminal
13, 23: peripheral wiring
14, 24: connection pad
A: fine metal wire
D1: first direction
D2: second direction
H, M: line width
Hs: average line width
L1: electrode length
L2, L3: length
P1, P2, P3: position
R1, R2: region

What is claimed is:

1. A touch sensor comprising:
   a substrate; and
   conductive layers formed on the substrate,
   wherein the conductive layer has
   a touch detection electrode that is composed of a plurality of fine metal wires arranged in a mesh shape and extends over a determined electrode length L1 from a first end part to a second end part along a determined extension direction,
   a connection terminal electrically connected to the first end part of the touch detection electrode, and
   a peripheral wiring electrically connected to the connection terminal,
   the plurality of the fine metal wires of the touch detection electrode each has a layer to be plated and a metal plating layer covering the layer to be plated, and
   an average line width Hm of the layers to be plated of the plurality of the fine metal wires in a region between the first end part and a position apart from the first end part toward a second end part side along the extension direction by ⅒ of the electrode length L1 is narrower than an average line width Hs of the layers to be plated of the plurality of the fine metal wires at a position apart from the first end part toward the second end part side along the extension direction by ½ of the electrode length L1.

2. The touch sensor according to claim 1,
   wherein the average line width Hm and the average line width Hs in the layers to be plated satisfy a relationship of $$Hs \times 0.80 \leq Hm < Hs \times 0.90.$$

3. The touch sensor as according to claim 2,
   wherein a ratio Ms/Hs, which is a ratio of an average line width Ms of the plurality of the fine metal wires at a position apart from the first end part toward the second end part side along the extension direction by ½ of the electrode length L1 to the average line width Hs of the layers to be plated, is from 1.25 to 1.60.

4. The touch sensor as according to claim 1,
   wherein a ratio Ms/Hs, which is a ratio of an average line width Ms of the plurality of the fine metal wires at a position apart from the first end part toward the second end part side along the extension direction by ½ of the electrode length L1 to the average line width Hs of the layers to be plated, is from 1.25 to 1.60.

5. The touch sensor according to claim 4,
   wherein the average line width Ms of the plurality of the fine metal wires is from 1.50 μm to 2.00 μm.

6. The touch sensor according to claim 4,
   wherein the ratio Ms/Hs, which is the ratio of the average line width Ms of the plurality of the fine metal wires to the average line width Hs of the layers to be plated, is from 1.25 to 1.45.

* * * * *